INVENTOR.
EUGENE B. SUTHERLAND
BY
Walter J. Monacelli
ATTORNEY

June 8, 1965  E. B. SUTHERLAND  3,188,048
VALVE HAVING RADIALLY CONTAINED PACKING
WITH AXIALLY ACTING FOLLOWER
Filed July 13, 1961   3 Sheets-Sheet 3

INVENTOR.
EUGENE B. SUTHERLAND
BY
Walter J. Moracelli
ATTORNEY

United States Patent Office 3,188,048
Patented June 8, 1965

3,188,048
VALVE HAVING RADIALLY CONTAINED PACKING WITH AXIALLY ACTING FOLLOWER
Eugene B. Sutherland, Akron, Ohio, assignor to Taylor Instrument Co. (Ohio) Inc., Akron, Ohio, a corporation of Ohio
Filed July 13, 1961, Ser. No. 123,845
8 Claims. (Cl. 251—62)

This invention relates to an improved valve. More specifically it relates to a valve adapted to having a heavy pre-load on the valve packing and capable of operation under heavy pressure and high temperature conditions.

When valves using heavy preloads on the packings are exposed to high temperatures, the packing loses its sealing effectiveness more or less gradually as the valve is used, particularly when the valve is exposed to periodic temperature changes.

Various methods of packing valves and means for applying preload pressures on the packing have been tried. However, these various methods have been ineffective or have gradually lost their effectiveness.

For example, heavy pre-load pressures have been applied on valve packing means but under a screw device arrangement which does not allow fluctuations in pressure. Such screw device arrangements do not permit variations in spring pressure as they are accordingly desirable in the operation of the valve. In other words when it is desirable to increase pressure, such as in moving the valve disc forward, this is not possible with a screw device arrangement.

A particularly effective valve capable of continued efficiency of the sealing means under heavy pre-load conditions even when operated under high temperature and high pressure condition and variations thereof, has now been found as described herein.

With valves of prior design, it has been difficult to maintain efficiency under high pre-load. However, the valve of this invention operates efficiently with pre-loads of 300–600 p.s.i. and even higher. Preferably, the nominal pre-load is approximately 420 p.s.i.

Figure 1:
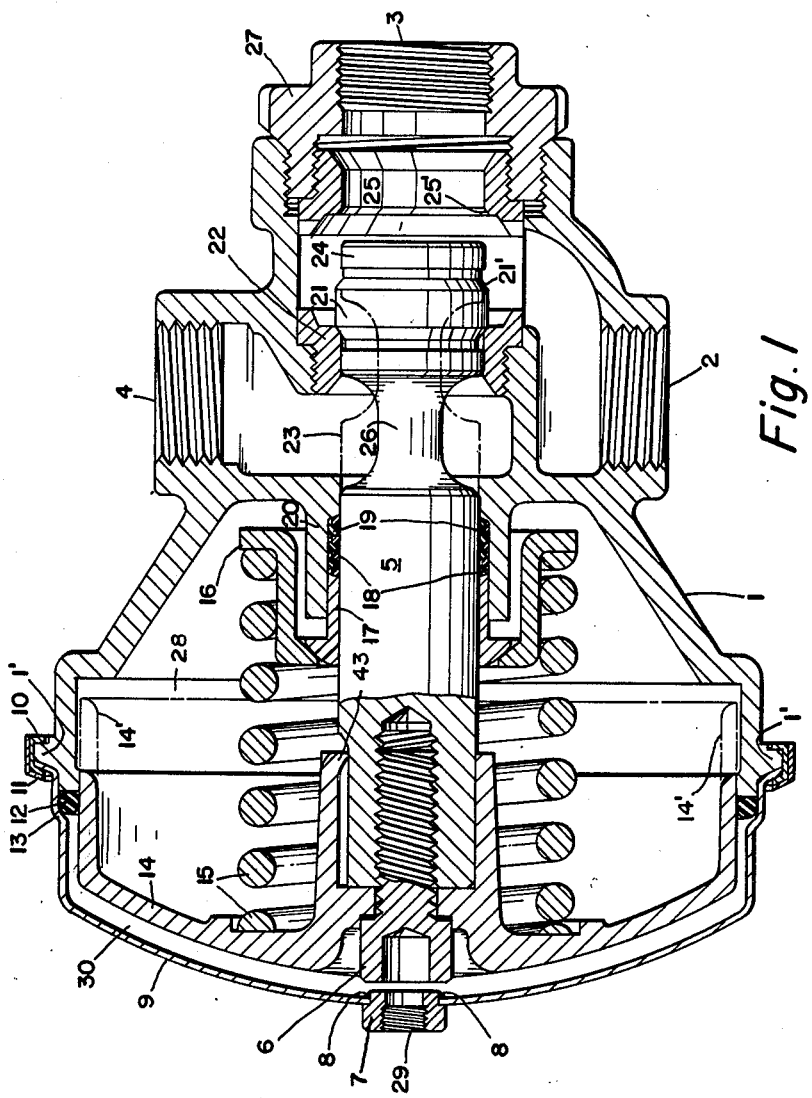
FIGURE 1 is a transverse cross-section of a three-way valve of this invention.

The valve of this invention comprises a main body or housing portion having a plurality of openings therein for flow of fluid therethrough. In a two-way valve, there are two such openings; in a three-way valve, there are three such openings, etc. The control of fluid between these openings is maintained by a disc positioned on a valve stem in such a manner that when the disc is moved to one position, it cuts off flow between the openings and when it is moved to another position or to intermediate positions therebetween, the flow of fluid is permitted between two or more of such openings. Since the valve and stem are assembled on one piece, both are sometimes indentified herein by the term "disc."

One of the main features of this invention is the packing used to prevent leakage of fluid between the valve stem or disc and that part of the main body of the valve in which the valve stem or disc is positioned. This packing comprises a series of rings of resilient material fitting around the valve stem and occupying the space between the valve stem and the adjacent portion of the main body of the valve. A cross-section of these rings has the shape of a truncated triangle. Every other ring in the series is shaped so that the wider portion or base of the triangle is positioned next to the valve stem, with the narrower portion or the top of the truncated triangle extending outwardly from the valve stem. These are referred to as "cone" rings. Alternate rings in this series have a shape in which the cross-section has the base or wider portion of the truncated triangle facing away from the valve stem and the narrower portion or the top of the truncated triangle facing toward or adjacent to the valve stem. These are known as "cup" rings.

In this way the alternate rings can adjust themselves as pressure is exerted from the side of the rings so that as pressure is increased to squeeze the rings together, the outer circumference of the "cup" rings, i.e., those having the broad base of the truncated triangle cross-section facing away from the valve stem can be forced farther away from the valve stem and thereby into closer contact to the adjacent portion of the main body of the valve. As the space between the valve stem and the adjacent portion of the main body of the valve is increased or decreased, the space is filled completely with the complementary rings so as to effect a tight seal between the valve stem and the adjacent body portion and thereby prevent leakage of fluid therethrough.

These rings are preferably made of polytetrafluoroethylene, which is available commercially under the trademark "Teflon," although other plastics materials having similar properties under the conditions of operation can be used satisfactorily. Such material is found to be of sufficient resiliency and strength to adjust itself to the conditions of operation and to give very effective sealing. Virgin polytetrafluoroethylene is found to be suitable, as well as polytetrafluoroethylene containing a minor portion of various modifiers, such as, for example, polytetrafluoroethylene containing powdered graphite, molybdenum disulfide, asbestos, etc. For example, particularly effective results have been found with polytetrafluoroethylene containing approximately 15 percent graphite therein, polytetrafluoroethylene containing approximately 5 percent molybdenum disulfide therein, and also asbestos containing at least approximately 5% by weight of polytetrafluoroethylene therein.

Satisfactory results have also been obtained with rings of similar shape made from graphite, either as such or modified with a minor portion of polytetrafluoroethylene. Asbestos can also be used when it is modified with polytetrafluoroethylene or graphite, or one of the other plastic materials such as nylon, polymeric dichlorodifluoroethylene, etc. to give it more sliding or slippery character.

Typical of other plastics materials that can be used for such sealing or stuffing rings are nylon, polymeric dichlorodifluoroethylene, polyethylene terephthalate, polymeric acrylonitrile, etc. These can be used as such or modified with one or more of the other materials mentioned herein. One of these plastics is the commercial product available under the trademark "Kel–F." Others are available commercially under the trademarks "Orlon," "Mylar," "Dacron," etc. Nylon is advantageously used where moisture is not present in the fluid being passed through the valve since it has a tendency to absorb moisture. Obviously the material will be selected according to what particular use will be made of the valve so as to use a sealing material which is resistant to the fluid being passed through the valve.

Normally about 7 of the sealing rings are advantageously used in a valve, 4 being of the "cup" type and three of the "cone" type. However, as few as three such rings can be used, advantageously two cup and one cone, but it is preferred to use at least five rings, e.g., three cup and two cone. The maximum number is determined solely by practical considerations of space and economics.

The rings are kept in tight contact with each other by a follower gland which encircles the valve stem or disc and is kept under constant pressure by a coil spring, which has the end opposite to that exerting pressure upon the follower gland pressed against a piston which is fixed to the valve stem or disc.

In a preferred modification of this invention, the spring portion which exerts pressure against the follower gland rests against the spring plate which in turn rests against the follower gland. While the spring plate and follower gland may comprise one piece, it is preferred to have the spring plate in a separate piece and concentric with the follower gland in such a manner that the spring plate may be self-aligned so as to accommodate any unevenness in pressure exerted thereon by the spring and thereby avoid uneven pressure on the follower gland. This prevents any biting of the follower gland into the disc or valve stem.

It is also desirable to have the surface of the spring plate which comes into contact with the follower gland at an angle of less than 90° with the cylindrical axis of the spring plate with this angle facing in the direction toward which the spring is exerting pressure on the follower gland. The corresponding contact surface of the spring plate can have approximately the same angle so as to fit onto the contact surface of the follower gland. However, it is preferred to have this contact surface on the follower gland rounded or spherical so as to permit self-alignment between the spring plate and follower gland.

While the cross-section of the contact surface of the spring plate is shown as a straight line in the drawings, it can also be curved, with the cross-section of the follower gland contact surface being convex and the corresponding contact surface of the spring plate being concave. However, a typical preferred arrangement has been found to be one in which the follower gland surface has a rounded or spherical surface and the spring plate an angular surface or one whose cross-sectional line is at an angle of less than 90° to the cylindrical axis of the spring plate, advantageously an angle of approximately 45°.

The valve stem or disc and piston are fixed to each other, advantageously by means of a threaded bolt fitting into the end of the valve stem or disc opposite to the fluid control end or disc skirt end and adapted to being turned by a key or crank or other device. A preferred means of turning this bolt is by having a square or hexagonal opening in the end thereof into which a key or crank can be inserted. The turning of this bolt draws the piston toward the end of the valve stem or disc and puts pressure on the coil spring located between the piston and the spring plate. The piston rests against the head of the bolt in such a manner that the piston and valve stem or disc can be drawn together by turning the aforesaid bolt in one direction, and for disassembly can be separated from each other by turning the bolt in the opposite direction.

While the spring plate can be a flat plate extending at an angle of 90° from the axis of the follower gland with which it is in contact, it is preferred to have the spring plate recessed or underslung so that a substantial portion thereof is cylindrical and has the same axis as the follower gland with a lip or extension turning perpendicularly outward from this cylindrical portion so as to receive the end of the spring which is to exert the pressure thereon. In this manner the valve can accommodate in a rather compact space a spring of greater overall length under preload conditions than the actual length of the space between the end of the follower gland and that part of the piston against which the spring presses. The underslinging of the spring plate also gives leverage for easy self-aligning of the spring plate with respect to the follower gland.

A cover is fitted over that end of the valve body in which the piston is located. As described more fully hereinafter, the disc is advantageously moved from one position to another by the application of air pressure between this cover and the piston. Therefore, an effective fastening of the cover to the main valve body and sealing between the cover and piston must be effected to accommodate the air pressure required for movement of the disc. This cover is effectively fixed to the main body of the valve by a split ring which is held in position by a retaining ring. While such split ring-retaining ring arrangements have been used for various other purposes, this is a novel application as a simple, and yet, sturdy method of affixing the cover to the main body of a valve where air pressure is to be the activating force in operation of the valve.

The unexpectedness of this method of affixing the cover is demonstrated by the fact that it is sometimes necessary to reassure customers that the retaining ring is not easily displaced. While no such additional device is necessary, it has been found desirable merely as reassurance to customers to place a single screw to hold the retaining ring in position. However, the tight fit of the retaining ring over the sealing ring is sufficient to hold the retaining ring in position even with the considerable jarring and movement caused by the variations of pressure applied to the valve.

The sealing between the cover and the main valve body as well as between the cover and the piston is effected advantageously by a cylindrical O ring, advantageously made of rubber or similar materials, which is held against the main valve body by a shoulder in the cover. This also presses the O ring against the side or shoulder of the piston. This simple arrangement of split ring and retaining ring effects an effective and sturdy securing of the cover to the main body of the valve, and the O ring arrangement gives a simple and effective sealing so that air pressure can be applied for movement of the disc.

In the operation of the valve, the disc or valve stem remains in one position by virtue of the spring pressure exerted thereon. When it is desired to shift the disc to another position, air pressure is applied between the cover and the piston so as to move the piston away from the cover and thereby also move the disc which is attached thereto. This air pressure is advantageously applied by fastening an air pipe or hose to a connection in the cover. Air pressures of 25–50 p.s.i. are found suitable for this purpose although other pressures can obviously be used depending on existing conditions.

The valve of this invention is best illustrated by reference to the drawings. In FIG. 1, valve housing of body 1 has three openings, 2, 3, and 4 for the flow of fluids through the valve, the flow being controlled by the position of the valve stem or disc 5 which is shown in partial cross-section for illustration of the bolt 6 which is threaded into the head of valve stem or disc 5. Cap 7 is welded onto and secured by weld portion 8 to cover 9 which fits onto the housing and is fixed thereto by split ring 10 and retaining ring 11, which fit over shoulder 1' of the valve main body. An O ring 12 effects a seal between the cover 9 and the main valve body or housing. The O ring is held in position by shoulder 13 of the cover 9. Bolt 6 holds piston 14 in pressure against spring 15 so as to maintain the desired pre-load pressure against spring plate 16 which in turn presses against follower gland 17 thus holding rings 18 and 19 in sealing position between valve stem 5 and packing box 20. Dotted sections 14' show the position of the piston shoulders against rim 28 when the piston and disc are moved forward or to the right. Key 43 prevents the piston 14 from rotating on its axis.

When the valve stem 5 is in the position shown in the drawing, fluid entering opening 3 will flow through the valve and out through opening 2. Flow through opening 4 is prevented by the tight positioning of disc portion 21 against valve seat 22.

When valve stem or disc 5 is moved forward to position shown by dotted line section 23, disc skirt 24 fits tightly into opening 25 cutting off flow through opening 3. Leakage is cut off by tight sealing of portion 21' with portion 25'. At the same time the narrow neck 26 of the valve stem or disc in the dotted position permits flow beween openings 2 and 4.

For operating the valve, an air line fitting can be connected by inserting into threaded section 29 of cap 7 and air pressure applied into space 30 so as to force the disc forward to the position shown by the dotted lines. Release of the air pressure allows the disc to resume its original position.

By having the fluid flow into the opening 2, the position of the disc shown in FIG. 1 will permit flow out through opening 3, whereas positioning of the disc in the dotted line position shown in FIG. 1 will give flow out of opening 4. In another method of connection where fluid is applied under pressure through opening 4, the dotted line position of the disc shown in FIG. 1 will give flow through the valve and out of opening 2. Then upon release of the air pressure and permitting the disc to go back to the position shown in FIG. 1 with the disc portion shown in solid lines, flow from opening 4 will be cut off and exhaust of fluid from opening 2 will be allowed to pass out through opening 3. Obviously various modifications can be made by appropriate connections and various other conditions which are common in the art.

The valve of FIG. 1 can be converted to a two-way valve by replacement of nipple 27 with a cap similarly threaded for fitting into the valve body but without opening 3.

As shown in the drawings, the cross-sections of rings 18 have the shape of truncated triangles with the base or wider portion of the cross-section of each ring 18 being in contact with valve stem 5 and the alternate rings 19 having the narrower or inner edge of the ring facing toward the valve stem and the base or wider portion of the truncated triangle facing away from the valve stem. When follower gland 17 moves to the right, the rings are forced against each other in such a manner that the rings 19 are moved outwardly from the valve stem to the extent that there is space for such movement and thereby press more tightly against the surface of packing box 20 whereas the same pressure effects a tighter contact of rings 18 against disc 5. The resiliency and other properties of polytetrafluoroethylene and the other materials recited herein make rings of this type particularly effective and continuously efficient even at temperatures as low as −100° F. and as high as 400° F.

The spring plate 16 and follower gland 17 are preferably in two pieces as shown in FIG. 1. While the two may be joined in one unit in some cases, the preferred individual construction shown in the drawing has the advantage of permitting self-alignment between the two units, so as to prevent binding of the follower gland 17 against valve stem 5 in the event that the pressure against spring plate 16 is not evenly distributed. The underslung or recessed spring plate arrangement allows compactness in the valve arrangement even wtih a spring 15 of considerable length.

Figure 2:
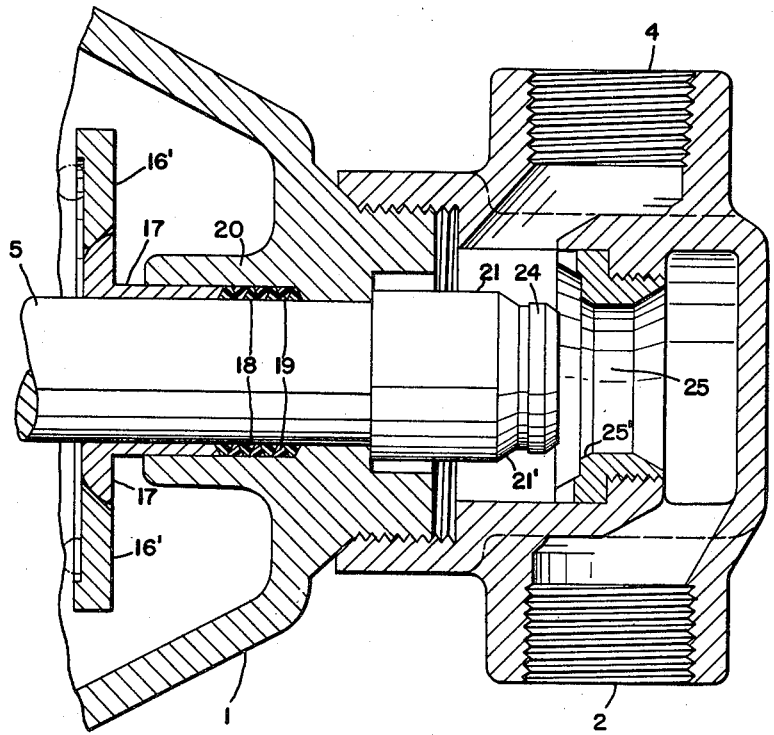
FIGURE 2 shows a transverse cross-section of a two-way valve of this invention.

FIG. 2 is a transverse cross-sectional view of a two-way valve representing a modification of this invention. The arrangement is similar to that in FIG. 1 except that there are two openings namely 2 and 4. When the disc is in the position shown, the flow between openings 2 and 4 is permitted. When the disc is moved to the right into opening 25, the flow is cut off.

In FIG. 2 the left-hand portion of the valve is not shown but it corresponds to that shown in FIG. 1 except that, since the spring plate in FIG. 2 is flat and not underslung or recessed as in FIG. 1, the portion of the valve body in which the spring would be positioned is actually longer to accommodate the same spring length. In this case since the spring plate is not underslung, the spring does not overlap the follower gland as in FIG. 1. The arrangement shown in FIG. 1 allows a more compact valve arrangement and is preferred.

Figure 8:
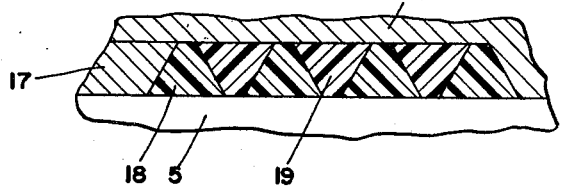
FIGURE 8 is an enlarged view of a part of the cross-section of the sealing rings shown in FIG. 2.

In FIG. 2 the sealing rings 18 and 19 are shown in a position which will be assumed when the distance between the packing box wall and the disc surface is the same as the thickness of the rings. This is shown more clearly in the enlargement of this section shown in FIG. 8.

Figure 7:
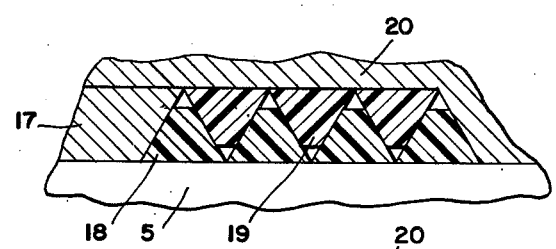
FIGURE 7 is an enlarged view of a part of the cross-section of the sealing rings shown in FIG. 1.

However, in FIG. 1, as well as in the enlargement of this section shown in FIG. 7, these rings are shown in a shifted position which is assumed when these rings are placed under spring pressure and the distance between these packing box and disc surfaces is greater than the thickness of the rings. For purpose of illustration these figures show a slight exaggeration of the actual open spaces. Under actual conditions there is less space than is represented.

Figure 3:
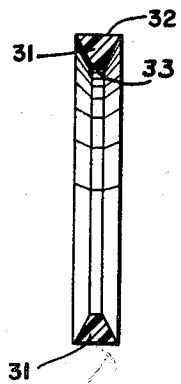
FIGURE 3 shows a cross-section of a "cup" sealing ring.

FIG. 3 shows a cross-section of the cup ring 19 of FIGS. 1 and 2. The cross-section is taken in a plane which includes the cylindrical axis of the ring. Truncated triangle cross-section 31 has its base 32 extending outwardly and its top 33 extending inwardly.

Figure 4:
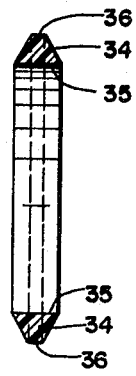
FIGURE 4 shows a cross-section of a "cone" sealing ring.

FIG. 4 shows a similar cross-section of the cone ring 18 of FIGS. 1 and 2. Truncated triangle cross-section 34 has its base 35 extending inwardly and its top 36 extending outwardly.

Figure 5:
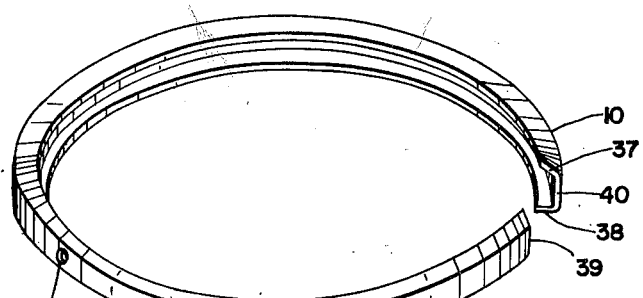
FIGURE 5 shows a perspective view of a split ring device used in fastening the cover to the main body of the valve.

FIG. 5 shows a perspective view of the split ring used for holding cover 9 onto the main valve body 1 of FIG. 1 by fastening over the edge of the cover and shoulder 1' of the valve main body as shown in FIG. 1. This split ring has one lip 37 which fits over the cover edge and another lip 38 fitting around shoulder 1' on the opposite side of the shoulder from that against which the cover edge rests. When the split ring is in position, edges 39 and 40 are brought together and held against each other by retaining ring 11. Threaded opening 41 is provided in case it is desired to fasten the retaining ring and split ring together by means of a screw or bolt.

Figure 6:
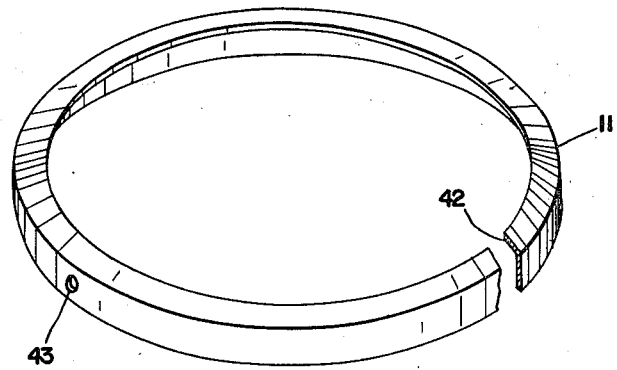
FIGURE 6 is a perspective view of the retaining ring used to hold the split ring of FIG. 5 in assembled position.

FIG. 6 shows a perspective view of retaining ring 11. Since this ring is a continuous ring a broken section is shown to illustrate the cross-section. This ring has lip 42 which in the assembled valve is pressed tightly against one lip of split ring 10. Opening 43 is provided for the insertion of a screw, where desired for fastening to split ring 10.

The valve of this invention permits preloading to a heavy minimum load which increases to a heavier load on each forward stroke of the valve. The efficiency of this valve has been found insensitive to wear in the packing box and to expansion and contraction, as well as to changes in the spring pressure. It has been found that wear in the packing box does not affect the preload condition noticeably. In this valve, it has been found that the packing is insensitive to changes in fluid pressure.

Under test conditions of over more than 50,000 cycles which is equivalent to approximately three years of service, in a commercial application, it has been found that there is no more than approximately 2% change in packing length.

Moreover, it has been noted that the axial overall length of the seal or packing adjusts itself slightly upon movement of the piston, generally about $\frac{1}{32}$ of an inch in a 7-ring arrangement. This is caused by variations in the spring pressure as the piston is moved forward and backward. This adjustment is an advantage in the valve operation, since the sealing rings thereby accommodate themselves to the conditions under which the valve is operated without any sacrifice of the sealing effectiveness of the packing. These conditions also effect self-adjustment of the packing outer surface in accordance with the surface conditions of the stuffing box, as well as adjustment of the inner surfaces of the sealing rings to the stem area in which the sealing rings are in contact. It is peculiar to the design of this invention that there is such self-adjustment of the sealing ring surface to the outer or packing box surface.

The valves of this invention are particularly suited to operation in fluid lines under nominal pressure and up to 600 p.s.i. and in a temperature range from −100° F. up to 400° F. These valves can be used under conditions where the pressures are continuous or varying, and with various types of fluids. They are particularly suitable for operation in systems where pressures need to be applied periodically, also under varying temperature conditions, and also where pressures applied need to be periodically exhausted, such as in the operation of tire presses, where steam, hot water, and cold water are used respectively with exhausting steps, in the operation of these tire presses.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A sealing means for a valve having a plurality of openings therein adapted for the flow of fluid therethrough, a valve member positioned in the valve between said openings and adapted to permit passage of fluid between said openings and adapted to be moved to another position in which said flow of fluid between said openings is prevented, comprising a fluid chamber, a valve stem reciprocable through a wall of said chamber, a sealing member encircling said stem to prevent leakage of fluid from said chamber along said stem, a piston fixed to said stem at a point removed from said chamber wall, a follower gland adapted to press said sealing means into position between said stem and wall of said chamber, a spring plate adapted to exert pressure on said follower gland, a coil spring adapted to exert pressure between said piston and said spring plate, said sealing means comprising a series of rings of resilient material having truncated-triangular cross-sections, every other ring in said series being shaped with the base of said truncated-triangular cross-section facing toward said stem and the alternate rings in said series being shaped with the bases of said truncated-triangular cross-sections facing away from said stem.

2. A sealing means of claim 1 in which said follower gland and said spring plate comprise individual pieces, the surface area of said follower gland which is in contact with said spring plate having an angle of less than 90° with the cylindrical axis of said follower gland facing toward the direction in which said stem is moved to said second position, and said spring plate having the surface area thereof which is in contact with said follower gland consisting of a concave surface having its center in the cylindrical axis of said spring plate.

3. A sealing means of claim 2 in which said sealing rings comprise polytetrafluoroethylene.

4. A sealing means of claim 3 in which said coil spring is adapted to exert a pressure of 300–600 p.s.i. between said piston and said spring plate, and when under said 300–600 p.s.i. pressure said coil spring has an overall length exceeding the distance between the point at which said spring exerts its pressure on said piston and the closest portion of said follower gland, the exceeding portion of said length being accommodated by an underslung portion in said spring plate.

5. A sealing means of claim 3 in which said valve has at least three of said sealing rings.

6. A sealing means of claim 2 in which said sealing rings comprise polytetrafluoroethylene and graphite.

7. A sealing means of claim 2 in which said sealing rings comprise asbestos and at least approximately 5 percent by weight of polytetrafluoroethylene therein.

8. A sealing means of claim 3 in which said valve has a cover thereon held in sealing position against the fluid chamber thereof by a split ring and a continuous retaining ring embracing a circular edge of said cover and a corresponding circular edge of said fluid chamber in close contact with each other, said split ring having a lip extending along each circumferential edge thereof and extending inwardly toward the cylindrical axis thereof, and said retaining ring being positioned in close contact on the outer circumferential surface thereof in a manner adapted to hold the split edges of said split ring in close abutting contact with each other.

References Cited by the Examiner

UNITED STATES PATENTS

| 1,574,052 | 2/26 | Mueller | 277—117 XR |
| 2,574,700 | 11/51 | Knauss | 121—48 XR |
| 2,744,775 | 5/56 | Bredtschneider | 251—214 |
| 2,883,145 | 4/59 | Sage | 251—61 |
| 2,892,608 | 6/59 | Collins | 137—625.5 XR |
| 2,929,405 | 3/60 | Beebe | 251—214 XR |

FOREIGN PATENTS 15,698 12/85 Great Britain.

ISADOR WEIL, *Primary Examiner.*

WILLIAM F. O'DEA, *Examiner.*